Dec. 23, 1969   J. B. EATON, JR   3,485,441
MAGNETICALLY BIASED COMPRESSOR CHECK VALVES
Filed Sept. 28, 1966
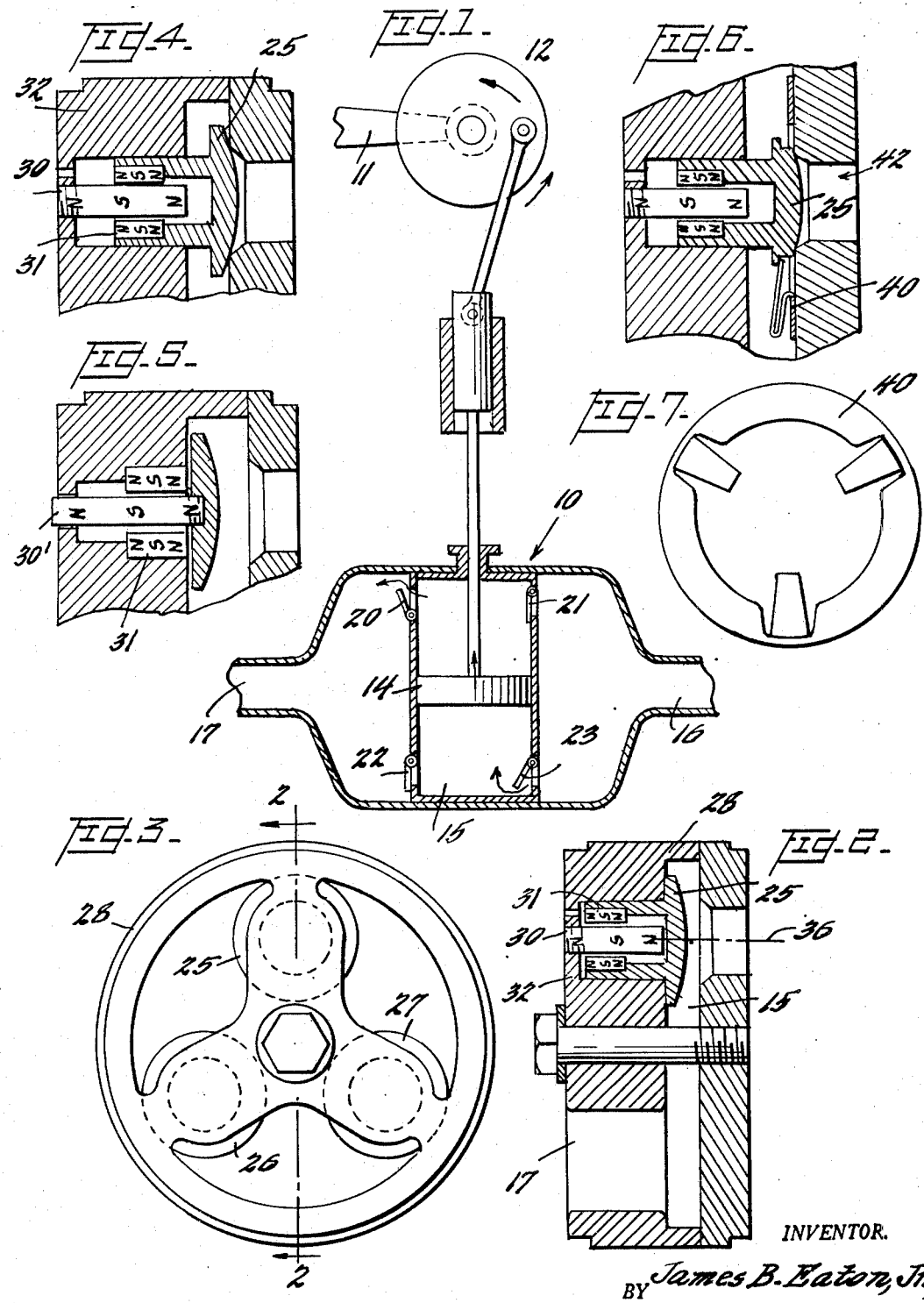
INVENTOR.
BY James B. Eaton, Jr.,
Watson, Cole, Grindle & Watson
ATTORNEYS

United States Patent Office 3,485,441
Patented Dec. 23, 1969

3,485,441
MAGNETICALLY BIASED COMPRESSOR CHECK VALVES
James B. Eaton, Jr., Owensboro, Ky., assignor to Texas Gas Transmission Corporation, Owensboro, Ky., a corporation of Delaware
Filed Sept. 28, 1966, Ser. No. 582,660
Int. Cl. F04b *39/10;* F16k *15/00, 31/08*
U.S. Cl. 230—228                                    8 Claims

ABSTRACT OF THE DISCLOSURE

Compressor valves are provided with bistable magnetic detents which are overcome by cyclic fluid pressures to produce a rapid efficient opening and closing action from fully closed to fully open position without throttling the exhaust fluids gradually.

---

This invention relates to compressors and, more particularly, it relates to control and structure of compressor check valves for regulating fluid flow through a compressor.

In conventional compressor pump check valves operated by spring pressure the pump has to work continually against the force of the spring and thus is inefficient. Furthermore, during certain portions of the pumping cycle, such valves tend to flutter and vibrate causing erratic pumping operation and short life. Also, the spring force requires carefully designed bearing structure along the valve axis or actuating path and even then the shaft may under some conditions be displaced along the axis of operation in such a way that the valves are not properly seated causing leakage, wear or failure.

Accordingly, it is a general object of this invention to provide more efficient compressor check valves which remove the deficiencies of working against a continuous spring pressure.

Another object of the invention is to provide improved valve alignment structure which precludes improper seating.

Therefore, in accordance with this invention the compressor check valves are operated magnetically to provide stable open and closed positions which permit flow of fluids without working against a continual force. In accordance with one aspect of the invention the magnetic structure is so fashioned by use of a cylindrical magnet and a coaxial cooperative magnetic rod that the combination constitutes a magnetic bearing for retaining the valve in an actuating path that assures proper seating of the valve.

Various aspects of the invention are described in detail in the following specification with reference to the accompanying drawing, wherein:

FIGURE 1 is a sketch of a typical compressor illustrating operational characteristics related to the present invention;

FIGURES 2 and 3 are respectively side section and plan views of a three poppet valve assembly incorporating the invention;

FIGURE 4 is a sketch, partially in section of a valve assembly as afforded by one particular embodiment of the invention in closed position;

FIGURE 5 is a sketch, partially in section, of a different valve structure embodying the invention; and FIGURES 6 and 7 are respectively side views partly in section of a valve with an auxiliary operating spring assembly and a plan view of the spring.

As seen from FIGURE 1, a compressor pump unit 10 is driven by a motor or the like through shaft 11 and flywheel 12 to reciprocate piston 14 back and forth in cylinder 15. Air, gas, or some other fluid is taken into inlet passageway 16 and is compressed in cylinder 15 by action of piston 14 to pass out of outlet passageway 17 at increased pressure.

In operation, the valves 20, 21, 22, and 23 are schematically shown in the upstroke position of piston 14. Thus, inlet valve 21 in the upper cylinder portion is held closed by pressure inside cylinder 15 and outlet valve 20 is pushed open to let the compressed air out of the cylinder into outlet passageway 17. In the lower cylinder portion, suction of piston 14 serves to draw closed the outlet valve 22 and to open inlet valve 23 to permit cylinder 15 to receive a fresh charge of noncompressed air from inlet passageway 16. Conversely, this relationship changes as the piston reaches its uppermost position and starts downwardly so that air is taken into the upper cylinder portion and is removed from the lower portion.

Typical poppet valve type structure for this mode of compressor operation is shown in FIGURES 2 and 3, where three separate poppet valves 25, 26, 27 held in framework 28, permit air to flow for example, from within cylinder 15 to outlet passageway 17. The valve 25 shown in detail may be magnetically held in opened position as shown or conversely in the closed position of FIGURE 4.

Magnet structure for operating this embodiment of the valve comprises the rod magnet 30 and concentric cylindrical magnet 31, which are respectively attached to frame member 32 and the valve poppet 25 for relative concentric movement as the poppet valve moves along its axis 36 from open to closed positions. Because of the concentric structure of bar magnet 30 and cylindrical magnet 31 it constitutes a magnetic bearing which holds the valve poppet 25 in position along the axis 36 and prevents any tendency for misalignment that could result from mis-seated spring structure, etc.

Furthermore, the magnetic structure is so fashioned to provide astable snap action with stable positioning of the valve in either open or closed position after passing through an unstable inbetween state. In this embodiment this action is effected by a tri-magnetic pole structure having, for example, a south pole S in the center of each magnet and a north pole N at the two opposite ends. Such structure can be attained by fastening together two shorter magnets, with like S poles together, for example. It may be seen therefore, that the central S poles repel to produce the unstable position and the valves are held in a limiting position by attraction between opposite N-S poles in either open or closed position as may be established by external forces derived from the fluid flow through the compressor as described in connection with FIGURE 1. This particular magnet structure is significant in producing a stronger astable force for quick snap action change from one position to another since with identical asymmetrical magnets, the central S pole is in essence twice as strong as one of the two N poles at each end when the length of the bar magnet is long enough to keep the end poles away from the end poles of the cylindrical magnet.

In one aspect of the invention these opposite end poles may be unbalanced in strength or be asymmetrical in distance from the center pole to provide a weaker holding force to be overcome in one direction than the other. For example, an outlet valve such as 20 may have a strong magnetic bias in the closed position in registration against its seat to assure that opening takes place only after a sufficient pressure within cylinder 15, but a weaker magnetic bias to hold the valve in open position so that reversal of the piston causes the suction action to close the valve quickly without significant escape of air from outlet passageway 17 back into cylinder 15.

If desired, a collar spring may be used for spring bias in one or the other position of the valve as shown for example, by use of the collar spring 40 in the views of FIGURES 6 and 7. This embodiment provides the auxiliary spring bias in the closed position of the poppet valve 25 which serves to open the valve against the holding force of the magnetic detent when fluid pressure at arrow 42 becomes high enough to overcome the detenting action, and the valve will remain open until opposite pressure of the fluid on the valve overcomes the magnetic holding detent in the open stable position. It is noted that after the magnet structure reaches the center unstable position the magnetic force aids in closing the poppet valve quickly to overcome the force of spring 40 and thus provides a quick efficient snap action rather than the inefficient squeeze-out which also substantially contributes to valve wear and unstable seating, and which is normally associated with simple spring bias which is solely overcome by fluid pressure.

Note that the spring 40 only contacts the valve over a portion of its movement as contrasted to a conventional valve spring whose force must be continuously overcome in one of the valve operating positions.

It is to be recognized therefore that novel compressor structure is provided by this invention operating on new principles to provide more efficient compression by means of a quickly operable snap action valve which rapidly goes from a fully open to a fully closed position to prevent squeeze-out and flutter inefficiencies normally associated with conventional compressor operation. The magnetic structure taught by this invention may have various forms and arrangements as exemplified for example by variations in FIGURES 4 and 5 where the bar and cylindrical magnets are affixed to different members. Other variations as to nature and strength of poles, shapes of structure and types of valve movement can be changed by those skilled in the art without departing from the spirit of this invention.

Having therefore described the nature of the invention in connection with the foregoing specific embodiments of the invention, those features of novelty descriptive of the spirit and scope of the invention are set forth with particularity in the appended claims.

What is claimed is:

1. A compressor system comprising in combination low pressure fluid intake means, higher pressure fluid discharge means, a compressor cylinder having a movable piston therein, a linkage for moving said piston within said cylinder and separate valves movable relative to the cylinder communicating between said cylinder and the respective intake and discharge means to open and close passageways from the cylinder to the respective intake and discharge means in response to relative fluid pressures between the cylinder and the respective intake and discharge means caused by movement of said piston, wherein a first one of the movable valves includes magnetic structure comprising two magnets located respectively on said first movable valve and on the cylinder structure for holding the said first movable valve stably in either open or closed positions by magnetic detent action and providing an intermediate unstable position magnetically biasing said first movable valve toward one of the closed or open positions wherein said fluid pressures are sufficient to overcome the magnetic holding force and move said first movable valve from one to the other of the stable positions.

2. The combination defined in claim 1 wherein said first movable valve has a linear degree of movement along its valve axis and said magnets being concentric magnets, one of which is coaxially mounted in a fixed position along the path of the movement of said first movable valve and the other of which is affixed coaxially with the axis of said first movable valve to thereby move therewith and constitute a magnetic bearing keeping the axis of said first movable valve in registration.

3. The combination defined in claim 2 wherein the two magnets are tri-polar and constitute the sole means for biasing said first movable valve in stable open and closed positions with the magnetic fields positioned to interact with each other in such manner that attracting poles of the two magnets detent said first movable valve in open and closed positions and opposing poles provide an intermediate zone of movement with an unstable position where said first movable valve is biased toward one of the detent positions.

4. The combination defined in claim 1 wherein said magnets are two tri-pole magnets relatively movable with fields interacting with each other in such position with one affixed to said first movable valve that attracting poles seat said first movable valve in open and closed positions and opposing poles provide a zone of unstable repelling position intermediate the open and closed positions.

5. The combination defined in claim 1 wherein the magnetic structure includes magnetic detenting poles in the open and closed position of different strengths to thereby produce different holding forces for open and closed positions of said first movable valve.

6. The combination defined in claim 1 including spring means operable to contact said first movable valve and provide supplemental spring bias only in the region near one of its stable magnetically biased detent positions.

7. The combination as defined in claim 1 wherein the magnetic structure includes magnetic detenting poles on the two respective magnets geometrically arranged with different distances between the poles.

8. The combination as defined in claim 1 wherein said magnets are tri-pole magnets with detenting structure comprising outer poles spaced asymmetrical distances from the center pole.

References Cited

UNITED STATES PATENTS

| | | | |
|---|---|---|---|
| 2,599,898 | 6/1952 | Dalrymple | 230—231 X |
| 2,609,669 | 9/1952 | Eddy | 251—65 X |
| 2,646,071 | 7/1953 | Wagner | 251—65 X |
| 2,811,979 | 11/1957 | Presnell | 251—65 X |
| 2,954,917 | 10/1960 | Bayer | 230—228 X |
| 3,032,060 | 5/1962 | Huffman | 137—529 X |
| 3,164,001 | 1/1965 | Yoshinaga | 251—65 X |
| 3,212,751 | 10/1965 | Hassa | 251—65 |
| 3,274,094 | 9/1966 | Klein | 137—529 X |

WILLIAM F. O'DEA, Primary Examiner

DAVID J. ZOBKIW, Assistant Examiner

U.S. Cl. X.R.

137—512.1, 517, 529; 251—65